June 18, 1957 F. A. ANDERSON 2,796,310
RECEPTACLE
Filed Nov. 21, 1955
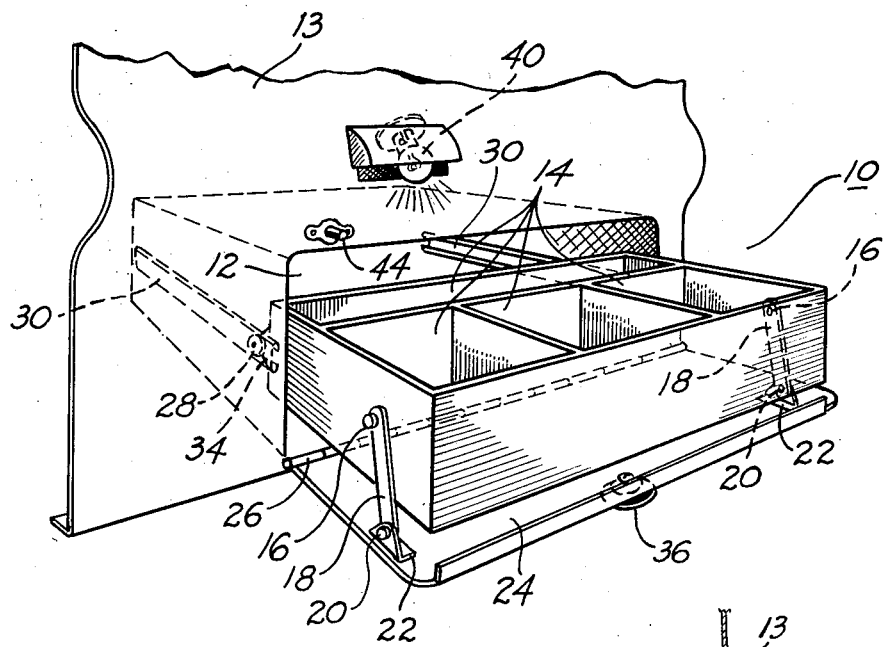
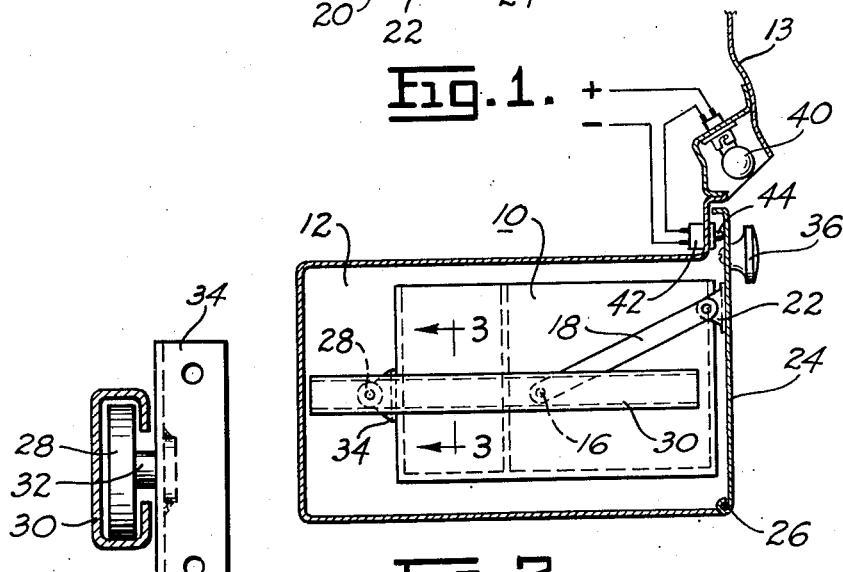
INVENTOR.
FLORENCE A. ANDERSON.
BY
ATTORNEY.

2,796,310
RECEPTACLE

Florence A. Anderson, South Bend, Ind.

Application November 21, 1955, Serial No. 547,992

1 Claim. (Cl. 312—246)

This invention relates in general to receptacles and more particularly to a receptacle adapted to be mounted in the interior of an automotive vehicle.

With the car of the day an occupant thereof seated within the driver's compartment often has difficulty in removing articles from the so-called glove compartment of the car; for such articles, including for example toilet goods and other miscellaneous items, are usually in a state of confusion and somewhat inaccessible.

It is accordingly an object of my invention to provide a relatively simple and cheaply constructed receptacle so mounted within the glove or other compartment of an automotive vehicle that the same may be easily withdrawn from the compartment thereby making goods normally housed within said compartment readily accessible to the occupant of the vehicle.

Another object of my invention is to provide an improved mounting for a drawer type receptacle said receptacle with its mounting being conveniently housed within the glove compartment of an automotive vehicle and easily withdrawable therefrom.

Other objects of the invention and desirable details of construction of parts will become apparent from the following detailed description of an illustrative embodiment of the invention, taken in conjunction with the accompanying drawing illustrating said embodiment, in which:

Figure 1 is a perspective view of my invention, the receptacle and its mounting being housed within the glove compartment of an automotive vehicle;

Figure 2 is a sectional view disclosing details of the mechanism of Figure 1; and Figure 3 is a view, taken on the line 2—2 of Figure 2 disclosing details of the roller guide of the mechanism of Figures 1 and 2.

There is disclosed, in the three figures of the drawing, a preferred embodiment of my invention. As is disclosed in Figure 1, this particular embodiment includes a drawer type of receptacle indicated in general by the reference numeral 10; and this receptacle or tray is slidably mounted within a recess or compartment 12 of a vehicle, preferably an automotive vehicle. The compartment 12, usually known as the glove compartment, is located in the dashboard 13 of the vehicle and is usually used to house miscellaneous items of use to the passengers of the vehicle; however, this tray receiving compartment may be located in any other convenient support member of the vehicle such as the back portion of the front seat structure of the vehicle.

Describing now the details of the mechanism constituting my invention, the receptacle 10, including a plurality of compartments 14, is provided with laterally extending pins 16 which fit within openings in the upper ends of links 18 to provide a pivotal connection. These links are pivotally mounted upon pins 20 mounted in brackets 22 which are secured to a cover plate 24 adjacent the upper edge of said plate. The plate 24 is pivotally mounted, by hinges 26, at the outer lower edge of the glove compartment or recess 12. The rear end of the receptacle 10 is slidably mounted within the glove compartment by means including rollers 28 which are preferably of nylon or a rubber material. These rollers are housed within elongated track members 30 preferably of steel, which are fixedly secured to the side walls of the compartment 12; and the track members are, as disclosed in Figure 3, generally rectangular in cross-section and outline a relatively narrow channel.

The rollers 28 are pivotally mounted on pins 32 which are fixedly secured to bracket members 34; and said members are fixedly secured to the back wall of the tray 10. A knob 36, adapted to be clasped by the hand of the occupant of the car, is secured to a cover plate 24; and an electric lamp 40, mounted in the dashboard immediately above the tray 10, serves to illuminate the tray and its contents when the tray is pulled out of the compartment 12. A spring operated switch 42 serves to control the lamp 40; and said switch is closed, to energize the lamp, when the cover plate 24 is rotated downwardly to the position disclosed in Figure 1. When the plate 24 is rotated to its closed position disclosed in Figure 2, a thrust member 44 is actuated to open the switch 42.

Describing now the operation of the mechanism of my invention, when an occupant of the driver's compartment rotates the cover plate 24 downwardly the tray 10 is withdrawn from the compartment 12, the parts of the mechanism being so constructed and arranged that the tray remains level; and this operation serves to energize the lamp 40. The occupant, having removed the desired article or articles from the tray, will then rotate the cover plate back to its closed position thereby returning the tray to its position within the compartment and extinguishing the lamp.

There is thus provided, by the relatively simple, compact and easily serviced mechanism of my invention, means facilitating an orderly arrangement of goods within the so-called glove compartment of an automotive vehicle and facilitating the removal of said goods from said compartment.

While the preferred embodiment of the invention has been described in considerable detail, I do not wish to be limited to the particular construction shown which may be varied within the scope of the invention, and it is the intention to cover hereby all adaptations, modifications and arrangements thereof which come within the practice of those skilled in the art to which the invention relates.

I claim:

In a passenger vehicle a compartment having a support member such as the instrument panel shaped to provide a recess, a tray adapted to be moved either into or out of said recess and having a back wall, means for effecting the aforementioned movements of the tray including a plurality of relatively narrow channel-shaped track members secured to side walls of the support member which walls in part outline the recess, bracket members secured to the back wall of the tray, a roller on each bracket member and extending within the track members to roll therein, a manually operable cover plate pivotally mounted on the support member at one edge of the recess and having a pair of brackets secured thereon adjacent its upper edge, a pair of pins secured to the tray and extending outwardly from the sides therefrom, and link members interconnecting the pins and the brackets on the cover plate so that the link members will automatically perform its operation of moving the tray either into or out of the recess with the operation of the cover plate with the pins of the mechanism entering into the said track members as the tray moves into the recess to maintain the tray substantially level at all times.

References Cited in the file of this patent

UNITED STATES PATENTS

| | | |
|---|---|---|
| 2,247,232 | Goldberg | June 24, 1941 |
| 2,344,800 | Butcher | Mar. 21, 1944 |
| 2,448,080 | Cobbs | Aug. 31, 1948 |
| 2,657,967 | Gilchrist | Nov. 3, 1953 |